No. 766,555. PATENTED AUG. 2, 1904.
J. C. H. STUT.
APPARATUS FOR MAKING GAS AND COKE.
APPLICATION FILED APR. 6, 1904.
NO MODEL. 4 SHEETS—SHEET 3.
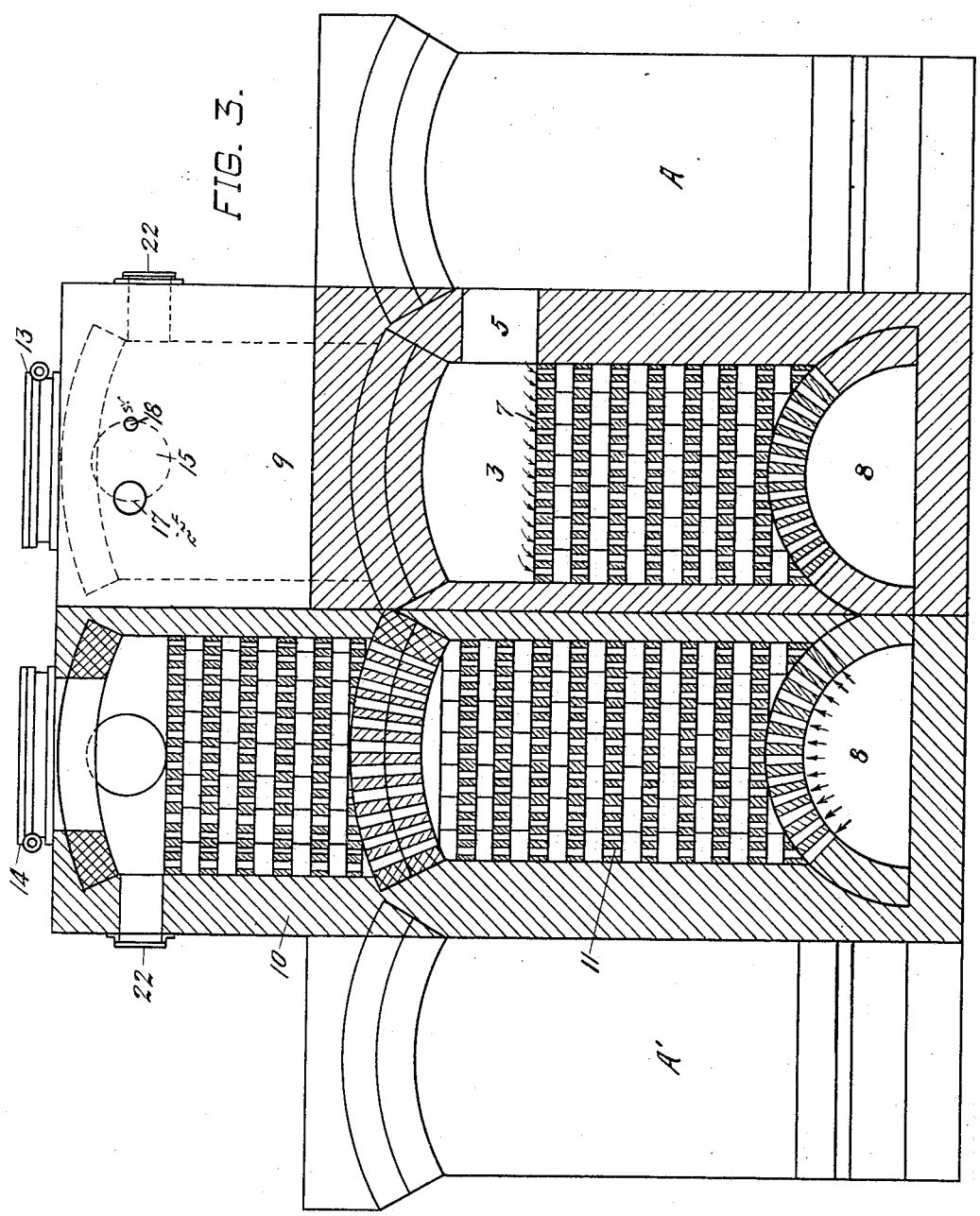
WITNESSES,
Chas. E. Chapin.
INVENTOR,
John C. H. Stut
By Geo. H. Strong
Atty

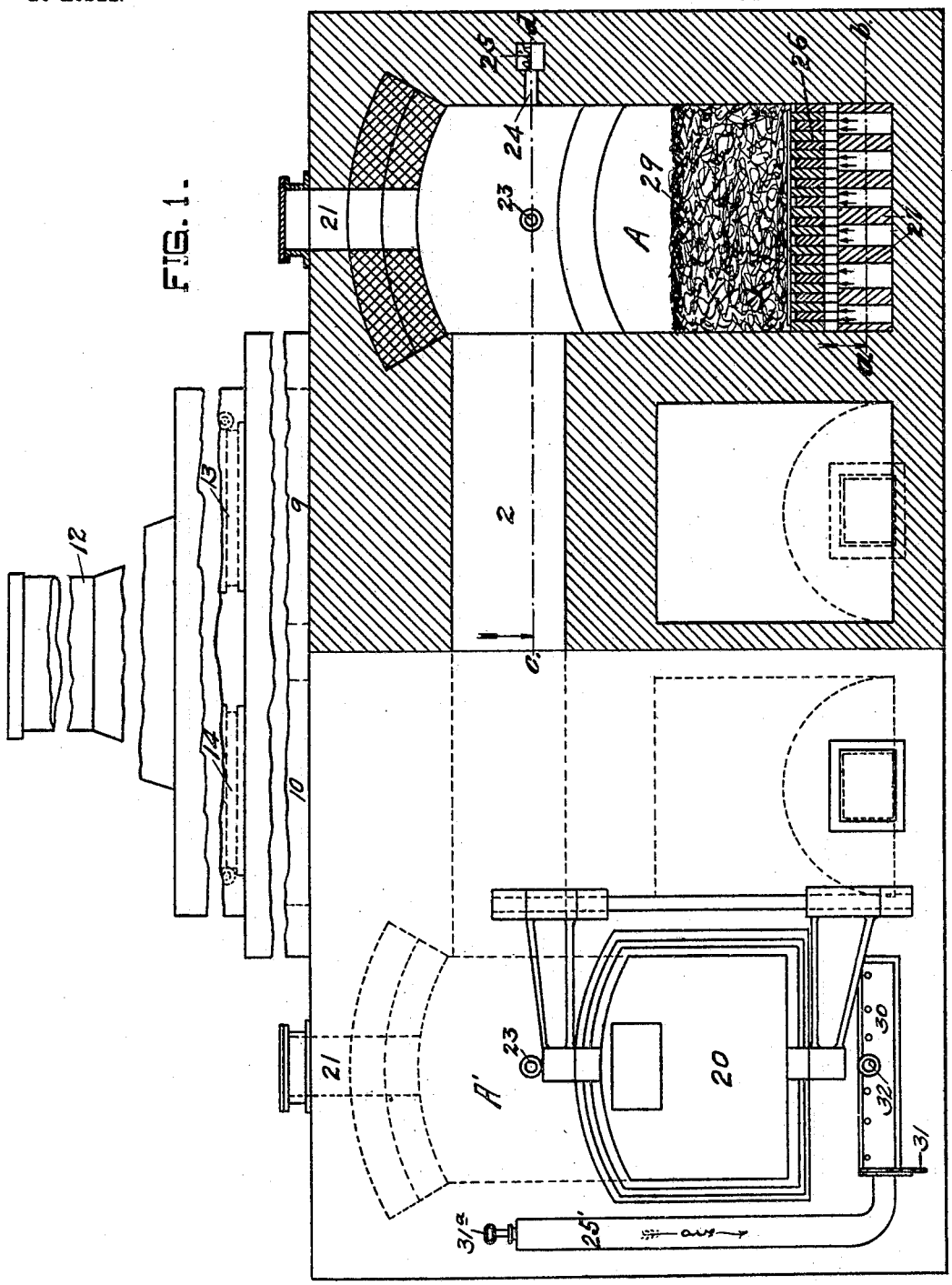

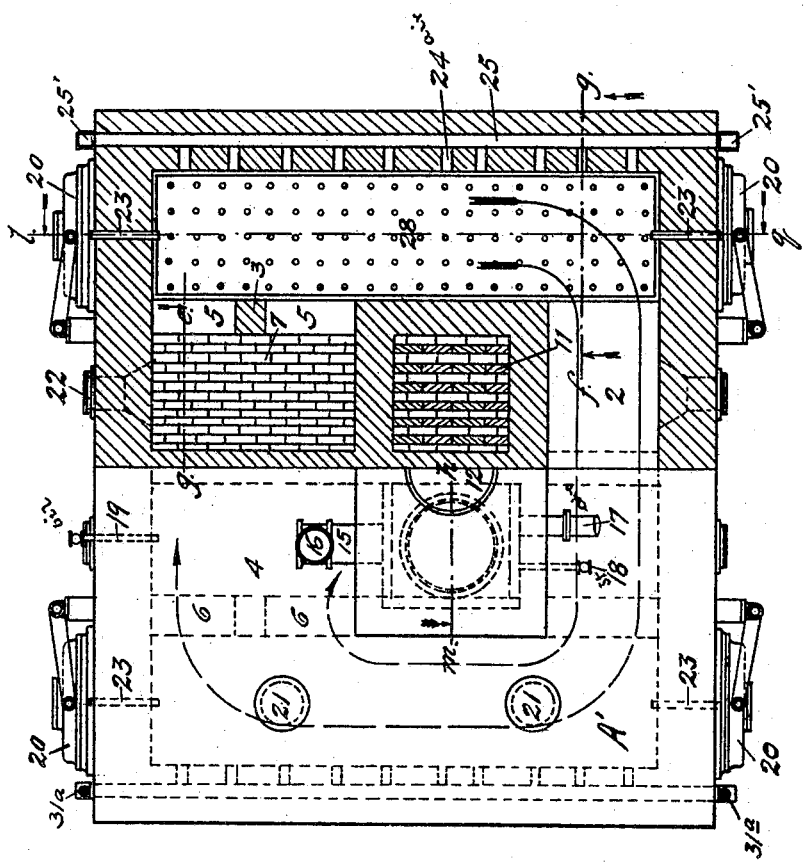

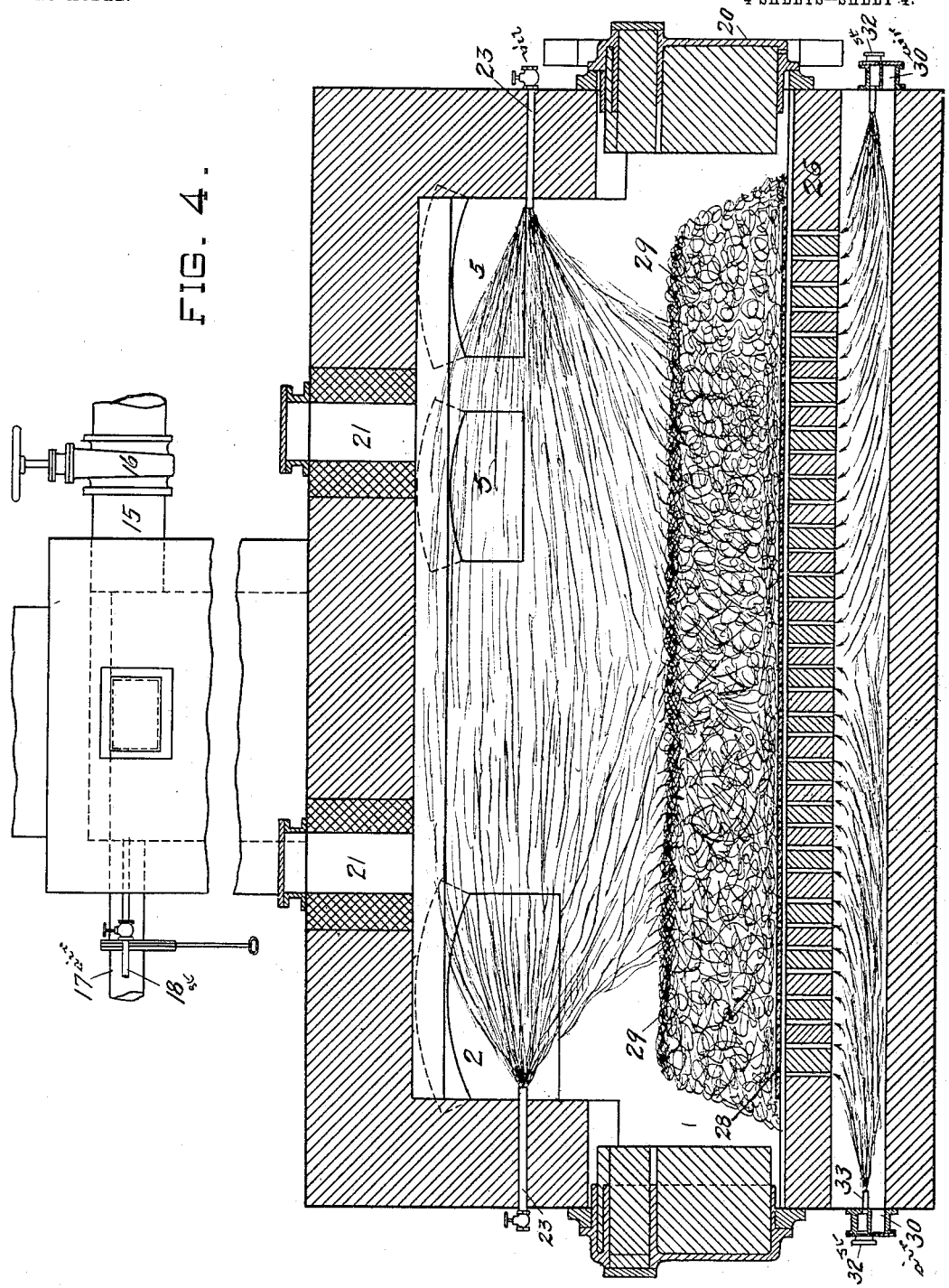

No. 766,555. Patented August 2, 1904.

UNITED STATES PATENT OFFICE.

JOHN C. H. STUT, OF OAKLAND, CALIFORNIA.

APPARATUS FOR MAKING GAS AND COKE.

SPECIFICATION forming part of Letters Patent No. 766,555, dated August 2, 1904.

Application filed April 6, 1904. Serial No. 201,851. (No model.)

*To all whom it may concern:*

Be it known that I, JOHN C. H. STUT, a citizen of the United States, residing at Oakland, in the county of Alameda and State of California, have invented new and useful Improvements in Apparatus for Making Gas and Coke, of which the following is a specification.

My invention relates to apparatus for manufacturing coke and illuminating-gas. Its object is to provide an apparatus particularly adapted for the making of gas and coke from crude oil.

In the manufacture of gas from crude oil alone it is essential that the oil sprayed into the ovens should have plenty of space and time in which to effect a molecular rearrangement of its more volatile portions and to allow the heavier residuum of the oil to settle. It is from the lighter portions of the oil that a large quantity of gas can be made, while the heavier tarry residuum is especially valuable in the manufacture of a good commercial coke. Under usual practices the oil is sprayed into a highly-heated cramped oven or chamber directly upon or against an incandescent brick surface or checker-work, the fallacy being that it is necessary to "crack" the entire body of oils. The practical result is that the lighter hydrocarbons, most rich in illuminating power, are converted mainly into lampblack, which is deposited in vast quantities in the carbureters and regenerators and a very poor commercial gas is produced. Furthermore, the impinging of the oil direct on the brickwork is also very detrimental to the brickwork. From experience it is shown that the very best fire-brick is soon destroyed and eaten away and has continually to be rebuilt. Arches, walls, and checker-work crumble rapidly where the intense flame strikes and impinges against them, incurring thereby great delay and expense for stoppages and repair to the ovens and brickwork.

I have designed an apparatus of the connected contiguous-oven type in which the conditions of space and time are provided for and whereby the heat of the ovens may be conserved to the carbureters and regenerators, which permits the quick withdrawal of the coke charge at any time from either oven and which is generally of simple and improved construction.

Having reference to the accompanying drawings, Figure 1 is a front elevation, partly in section, taken on line *f g* of Fig. 2. Fig. 2 is a plan view, partly in section, taken on line *c d* of Fig. 1. Fig. 3 is an elevation, partly in section, taken on line *e g h m* of Fig. 2. Fig. 4 is a section taken on line *q l* of Fig. 2. Fig. 5 is a section taken on line *a b* of Fig. 1.

A A' represent two parallel ovens connected above the fuel-line at one end by a large flue 2 and each connecting at the opposite end with an intermediate, individual, and respective carbureter 3 4 through passages 5 6. The carbureters are filled with the usual brick checker-work 7 and connect at the bottom through openings 8 with respective regenerators 9 10, also disposed between the ovens. By arranging the carbureters and regenerators thus between the ovens they receive the benefit of a great amount of radiated heat therefrom. The regenerators also are filled with checker-work 11 and each discharge into a single stack 12 common to both. Each regenerator is provided with a respective stack-valve 13 14 and a gas-pipe 15, leading to the scrubbers and collectors. (Not here shown.)

16 is a gas-valve in each pipe 15.

Air and steam may be admitted into the regenerators through respective valved pipes 17 18, and each carbureter is provided with an oil-pipe 19, which may be used in water-gas manufacture when it is desired to carburet or enrich the gas.

20 represents oven-doors; 21, covered ports for the entry of material from the top into the ovens, and 22 doors leading to the top of the regenerators.

Oil for purposes of heating and gas-making is admitted into opposite ends of each oven through pipes 23. Air to effect combustion of the gases in the ovens is admitted from the sides through the ports 24, connecting with the valved ducts 25. By having the air and oil streams counter to each other and admitting air practically at all points along the inflammable vapor column combustion is greatly assisted and heating is much more quickly effected.

The hearths 26 are perforate, and the space beneath the hearths is occupied by a series of longitudinal parallel supports 27, while on top of each of the hearths rests a removable perforated metal plate 28, supporting a body of coke or coal or preferably a layer 29 of refractory porous material.

Air is admitted beneath the hearths and at each end thereof from pipes 25', connecting with ducts 25, through boxes 30, having each an opening extending across the ends of the passages between the supports 27.

The admission of air beneath the hearths may be regulated by slide-valves 31 and to ducts 25 by valves 31$^a$.

Steam may be admitted beneath each hearth and at opposite ends thereof through a pipe 32, having a series of nozzles 33, directing a jet in between the several supports 27, whence the steam may pass upward through the hearths and permeable layer, there to contact with the contained incandescent carbon to become water-gas. The steam-nozzles are preferably disposed above the air-inlets.

In operation one oven is used alternately with the other.

To heat up the ovens, assuming the operation to be first from left to right, the gas-valves 16 are closed, as well as stack-valve 14, while stack-valve 13 is opened. Oil is admitted through pipes 23 at opposite ends of oven A' only, some steam being used with the oil to effect atomization. The two streams meet in the middle of the oven, making a uniform heat over the whole surface, and intense combustion occurs in the heating period by this means. Air to support the combustion is admitted through the regenerator 10 and through the side ports 24 in the brick wall of oven A'. Air in sufficient quantity only will be admitted from underneath the hearth, so as to consume the lighter hydrocarbons that might trickle down with the heavier residue into the refractory material 29, leaving thus the residue to form into coke in and on this refractory material.

Of course it is understood that the amount of oil introduced into the ovens must be so regulated as to be neither too much nor too little, because if too much it will have such a cooling effect that a large amount of residue or tar will result with little or no coke. On the other hand, when too little oil is introduced it will be all consumed and no coke will be made.

The quantity of oil to be introduced will depend on the quality of the oil, the amount of heat stored in the ovens, the temperature of the ovens, and the amount of air introduced either from above or below the hearths.

Just as the opposed streams of oil above the hearths act to cushion each other and equally distribute the gases in the ovens, so the air entering from opposite ends beneath the hearths will distribute itself over the sub-hearth space, and similarly during the gas-making period the steam from below will evenly distribute itself to pass up through the entire hearth area.

The combustion of the volatile-oil portion in the ovens is assisted greatly by the method of feeding air in at a number of points in the sides of the ovens, as through the parts 24.

Particularly will it be noted that the oil is not directed upon or into any brickwork. This is very important, not alone for the heating and coking period, but also for the gas-making period, because, as explained above, it gives time for the chemical rearrangement of the molecules to take place and effect a perfect combustion of the lighter oils in the heating period and for the heavier residue to become coked in the permeable layer 29, while this large empty space in the ovens and the time necessary before the oil strikes against any brickwork is also necessary in the gas-making period. In the latter period this large space allows the lighter oils or hydrocarbons to distil off and rearrange themselves into a good illuminating-gas without any interference of surface action, and so prevent the formation of a large amount of lampblack and inferior illuminating-gas. All chemical reactions require some time for development, and this is true in making illuminating-gas from oil.

During the heating period for oven A' the oil from the two meeting streams, with a regulated quantity of air above and below the hearth, will serve to heat up the walls of both ovens and carbureter 3 and regenerator 9. The more volatile and fugitive oils are consumed while the heavier residue of the oil drops onto the porous layer 29 and percolates therein and, as the heat grows intenser, is converted into coke.

The relatively large and empty oven spaces allow for the rearrangement of the oil molecules, which, as before stated, is so important and which should take place both in the heating and gas-making periods. The oil as it comes into the ovens is not acted on by surface or catalytic action. The only part of the oil affected by surface action is the separated heavier deposited particles, and these are gradually converted into coke. When a proper degree of heat has been attained in the ovens, carbureter, and regenerator, the stack-valve 13 is closed, also the air-passages in the regenerator 10, and the air-passages above and below the hearths, while the gas-valve leading from regenerator 9 to the scrubbers is opened. The apparatus is now ready for the gas-making. The spraying of the oil in two opposing streams into oven A' is continued. The gas now generated from the lighter hydrocarbons by the radiated heat of the oven-walls travels from chamber A' through the large connecting-passage 2 to oven A, thence traversing the length of the latter passes through the openings 5 into carbureter 3 and regenerator 9. It is not until the gas meets the checker-work in the carbureter that any obstruction is encountered.

The ovens A' A and the connecting-passage 2 are all devoid of baffle-walls and the like. Consequently they afford the space which is one factor in making oil-gas and oil-coke successfully and economically. Time, the second factor, is provided for in the interval necessary for the gas to traverse this space. Temperature, the third factor, is regulated according to the nature of the oil used. By this process I make a large amount of gas from the oil without breaking up too much of the lighter oils or hydrocarbons into hydrogen and carbon or so-called "lampblack," which does occur when the oil is sprayed or driven directly onto hot brick or checker-work, as explained above. The heavier oils that are not gasified in the large space above the refractory material will trickle on and into the incandescent coke or refractory material to be split up subsequently into hydrogen and coke.

In this apparatus the volatile oils and gases do not contact with the brickwork to any extent until they have traversed both ovens from end to end and come into the carbureters. The result is the molecules of the greater portion of volatile oil find time to rearrange themselves into molecules of illuminating-gas in the gas-making period and to become entirely consumed in the heating period.

The coke made in the heating period may be utilized, first, by consuming all the coke in the gas-making period in the manufacture of water-gas. To do this, a regulated quantity of steam is admitted from opposite ends beneath oven A' and allowed to pass up through the grate and permeable body of hot material and coke; second, by building up layers of coke one after another in successive heating periods, letting in at such times only enough air to generate heat for coking without consuming the coke, until a sufficient quantity of this coke has accumulated in an oven, to withdraw it from this oven through the doors 20 to be used for any commercial purpose. As previously described, the permeable layer 29 rests on a perforated iron plate, which in turn rests on the perforated brickwork or hearth. When this iron plate is drawn out from the oven through a door 20, all the material on top of this plate is also drawn out with it, and in this way the coke is recovered from the oven.

After a certain period of gas-making the ovens will cool down to a point such as to require reblasting. While in the gas-making period the lighter oils will be making illuminating-gas, the heavier oil residues will be accumulating in the bottom of the oven and will eventually form a considerable layer of uncoked material interpenetrating more or less the permeable body 29. This uncoked layer in oven A' will be transformed to coke in the heating period subsequent to the next succeeding heating and gas-making periods in oven A. In practice the ovens are worked alternately. Generally blasting and gas-making will go on in one oven, as A', and then blasting and gas-making in the other oven, or A.

It will be observed that with this oven arrangement the heat and gases all pass endwise through both ovens, and consequently plenty of time and space are afforded for the molecular rearrangement hereinbefore mentioned. Furthermore, by disposing the carbureters and regenerators between the ovens, as shown, they receive a great benefit from the radiated heat of the oven-walls and react one upon the other instead of being isolated or far removed from the original source of heat, as in ordinary apparatus of this character.

Having thus described my invention, what I claim, and desire to secure by Letters Patent, is—

1. In gas-making apparatus, a plurality of contiguous ovens, perforated hearths therein, means for admitting oil above the hearths from opposite ends of the ovens, means for admitting air or steam or both from opposite ends of the ovens beneath the hearths, said ovens connected at one end above the hearths and having discharge-passages at the opposite ends, and means whereby the gases generated in one oven must traverse the space of the adjoining oven before being discharged.

2. In gas-making apparatus, a plurality of contiguous ovens, perforated hearths therein, means for admitting oil above the hearths from opposite ends of the ovens, means for admitting air or steam or both from opposite ends of the ovens beneath the hearths, said ovens connected at one end above the hearths and having discharge-passages at the opposite ends, means whereby the gases generated in one oven must traverse the space of the adjoining oven before being discharged, and respective individual carbureters and regenerators intermediate of the ovens and connected with said discharge-passages.

3. In gas-making apparatus, a pair of ovens connected by a relatively large passage at one end, carbureters and regenerators intermediate of said ovens and connected with the ovens at the opposite end, perforated hearths in the ovens and means for admitting oil and air above the hearths and air or steam or both below the hearths.

4. In gas-making apparatus, a pair of ovens connected by a relatively large passage at one end, carbureters and regenerators intermediate of said ovens and connected with the ovens at the opposite end, perforated hearths in the ovens, means for admitting oil and air above the hearths and air or steam or both below the hearths, and removable perforated plates on said hearths whereby the solid contents of the ovens may be removed entire.

5. In gas-making apparatus, a pair of contiguous connected ovens and associated intermediate respective individual carbureters and regenerators, and means for heating said ovens and causing the gases generated therein to traverse both ovens before discharging into the carbureters and regenerators.

6. In gas-making apparatus, a pair of contiguous connected ovens and associated intermediate respective individual carbureters and regenerators, means for heating said ovens and causing the gases generated therein to traverse both ovens before discharging into the carbureters and regenerators, said ovens having perforated hearths and oil and air passages above and steam and air passages below said hearths.

7. In gas-making apparatus, a pair of ovens connected by a relatively large passage at one end, carbureters and regenerators intermediate of said ovens and connected with the latter at the opposite end, and means for heating the ovens.

8. In gas-making apparatus, a pair of ovens connected by a relatively large passage at one end, carbureters and regenerators intermediate of said ovens and connected with the latter at the opposite end, means for spraying oil into opposite ends of the ovens and means for delivering air along the sides of the ovens to the meeting oil-streams at right angles to the direction of said streams.

9. In gas-making apparatus, a plurality of parallel connected ovens, associated carbureters and regenerators, hearths in said ovens, means for admitting oil from opposite ends above said hearths, and means for admitting air at the sides of the ovens and transverse to the direction of the entering oil.

10. In gas-making apparatus, a plurality of parallel connected ovens, associated carbureters and regenerators, perforated hearths in said ovens, means for admitting oil from opposite ends above said hearths, means for admitting air at the sides of the ovens and transverse to the direction of the entering oil, and means for admitting air from opposite ends beneath said hearths.

11. In gas-making apparatus, a plurality of parallel connected ovens, associated carbureters and regenerators, said ovens connected at one end, means for spraying oil into said ovens at opposite ends, and means for admitting air at a plurality of points along the sides of said ovens.

12. In gas-making apparatus, a plurality of parallel connected ovens, associated carbureters and regenerators, said ovens connected at one end, means for spraying oil into said ovens at opposite ends, means for admitting air at a plurality of points along the sides of said ovens, perforated hearths in said ovens and a removable perforated hearth-plate extending over the hearth-surface.

In testimony whereof I have hereunto set my hand in presence of two subscribing witnesses.

JOHN C. H. STUT.

Witnesses:
 WARREN DIBBLE,
 G. M. DOGGETT.